INVENTOR
DUANE K. CHAPMAN
W. SIDNEY GREEN
JOHN W. NEWMAN
BY *Walter H. Schneider*
ATTORNEY INVENTOR
DUANE K. CHAPMAN
W. SIDNEY GREEN
JOHN W. NEWMAN
BY *Walter H. Schneider*
ATTORNEY

United States Patent Office 3,551,508
Patented Dec. 29, 1970

3,551,508
PRODUCTION OF POLYPHENYLS FROM SUBSTITUTED AND UNSUBSTITUTED AROMATIC COMPOUNDS
Duane K. Chapman, Ashland, Ky., William Sidney Green, Huntington, W. Va., and John W. Newman, Ashland, Ky., assignors to Ashland Oil, Inc., Houston, Tex., a corporation of Kentucky
Filed Dec. 18, 1968, Ser. No. 795,384
Int. Cl. C07c 15/14
U.S. Cl. 260—670
10 Claims

ABSTRACT OF THE DISCLOSURE

Process for arylating aromatic compounds using a molecular sieve catalyst, e.g. production of polyphenyls, which includes both substituted and unsubstituted biphenyl, terphenyl, and higher polyphenyl compounds.

BACKGROUND

It is reported in the patent literature that polyphenyls such as biphenyl may be produced by thermal (non-catalytic) pyrolysis of benzene at temperatures ranging from about 1100 to more than 1700° F. However, actual commercial operating experience has shown that at temperatures in the lower portion of the above-stated range undesirably slow rates of reaction and low percentages of conversion of feed result. On the other hand, at temperatures in the upper portion of said range the yield of the desired polyphenyl product is poor while the yields of tar, non-condensable gas, and coke are excessively large.

Production of these undesirable products not only wastes the feed material, e.g. benzene, but also pollutes the biphenyl product to the point that separation of a pure or light-colored product is prohibitively expensive. Accordingly, most commercial plants producing biphenyl and other polyphenyls from feeds such as benzene are operated so as to produce a yield of about 11 to 13½% biphenyl per pass, based on liquid feed to the reactor, at a temperature in the range of approximately 1400 to 1500° F. Temperatures much above or below this range are not suitable for commercial operations.

Failures of attempts to improve the performance of the process through the use of catalysts led to the observation of the Kirk-Othmer "Encyclopaedia of Chemical Technology," vol. 7, pp. 192–193 (1965) that ". . . it is doubtful if a catalytic reactor can be built that will give a much better performance than a well-designed thermal unit. The presence of a catalyst makes it difficult to maintain highly turbulent flow and to avoid pockets of stagnant vapor. Almost any surface becomes rapidly coated with carbon."

Thus, a need remains for improvements in methods of producing biphenyl, and polyphenyls. The principal object of this invention is to provide such improvements.

We have found that the foregoing object can be attained by contacting an aromatic compound under pressure and in the vapor phase with a molecular sieve. By so operating, we have found it possible to produce quite substantial yields of polyphenyl compounds at temperatures in the range of about 1125° to about 1375° F. while maintaining commercially acceptable rates and percentages of conversion of feed.

We have further found that it is most advantageous to contact the aromatic compound with a molecular sieve in the presence of at least one carbon oxide gas (e.g. CO, $CO_2$ or a mixture thereof).

BRIEF DESCRIPTION OF THE INVENTION

In view of the rather discouraging outlook for catalytic processes, it was quite remarkable to find that the performance of polyphenyl-producing processes could be improved by carrying out the reaction in a confined zone in the presence of a molecular sieve catalyst. We have found that the yield of polyphenyls prepared by reacting aromatics at a given temperature in the presence of a molecular sieve, as compared with the yield obtained under similar conditions in the absence of the molecular sieve, is greatly enhanced.

The aromatic compounds to which our invention is applicable are the mono- and poly-nuclear aromatics boiling in the range of about 170° F. to about 1000° F., preferably 170° to 600° F., at least 1 nuclear carbon atom of which is reactive toward a phenyl group. The aromatic compound may be fed to the process or in admixture with other compounds.

The following are just a few of the many reactions which may be conducted in accordance with our invention:

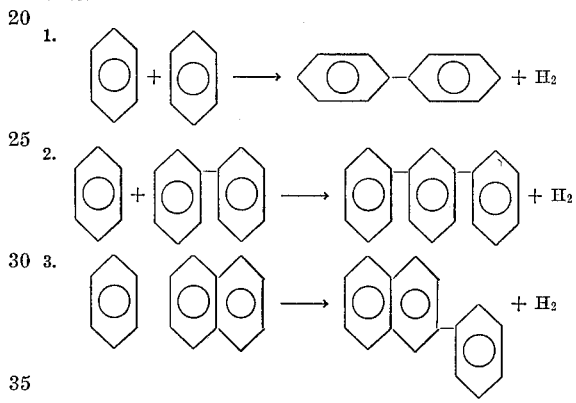

(In Equations 2 and 3 the product shown is only one of several possible isomers.)

The molecular sieves which are employed in accordance with the present invention belong to a class of compounds known technically as zeolites.

DESCRIPTION OF THE PREFERRED EMBODIMENTS

Figure 1:
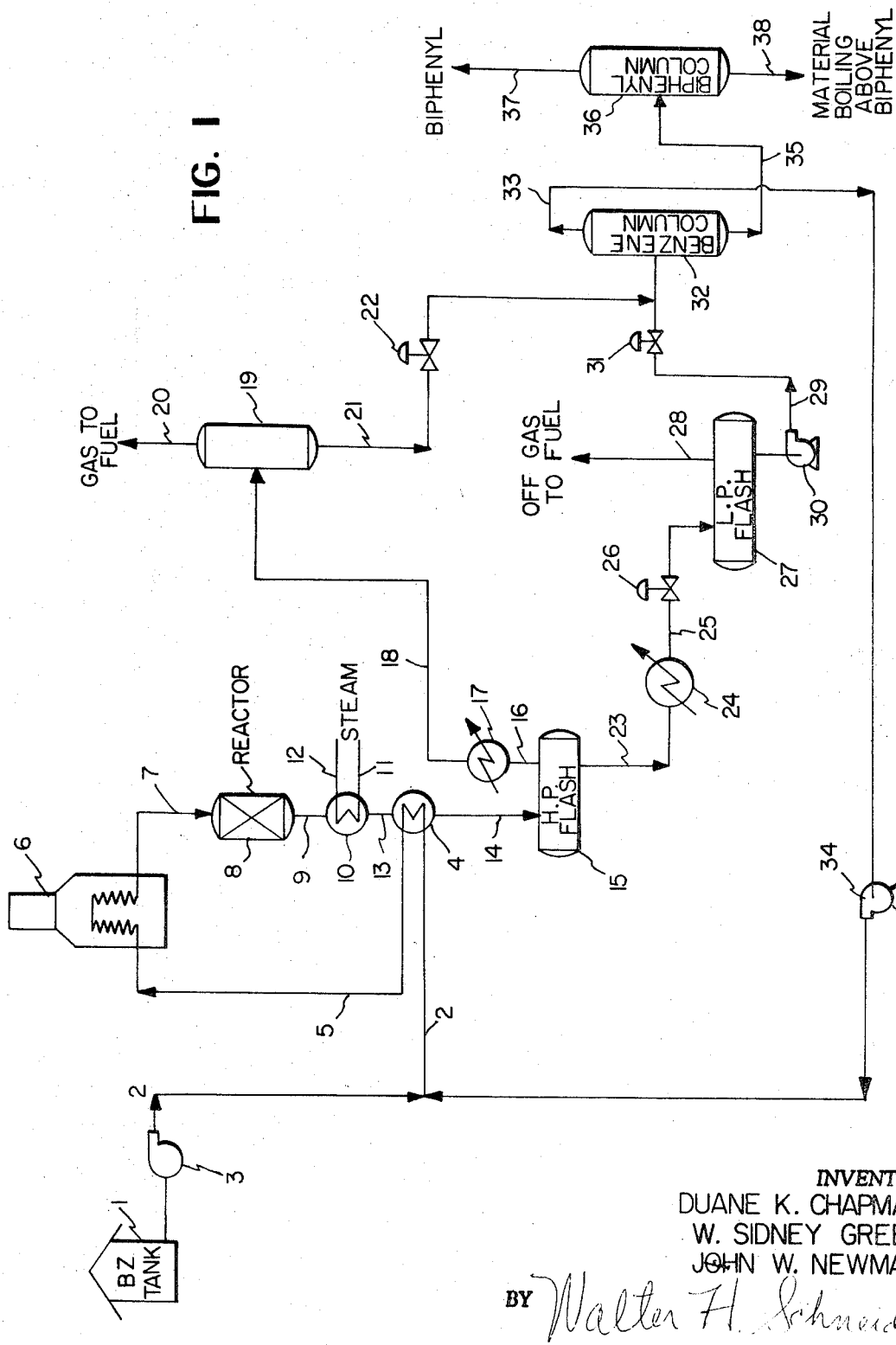
FIG. 1 illustrates the production of biphenyl using a molecular sieve catalyst.

The aromatic compounds which may be employed are the mono- and poly-cyclic aromatic hydrocarbon compounds such as benzene and its lower alkyl homologues, e.g., toluene and the xylenes, as well as naphthalene, and indane, and even biphenyl, any of which may be substituted or unsubstituted. The substituted aromatic compounds must, however, contain at least one hydrogen attached to the aromatic nucleus. The aromatic ring or rings of the aromatic compound and any substituent groups attached thereto may be substituted with phenyl, hydroxy, alkoxy, carboxy, halide and other radicals which do not prevent the desired reaction. Benzene is the preferred aromatic compound used in our process. However, mixtures of benzene and phenol may also be used in a molar ratio of about 1 to about 5 moles of the former per mole of the latter to manufacture para phenyl phenol and related products.

The molecular sieves used in accordance with our invention are hydrated, crystalline, metal aluminosilicates. Their outstanding characteristic is their ability to undergo dehydration with little or no change in their crystalline structure. These dehydrated crystals are interlaced with regularly-spaced channels of uniform molecular dimensions in which adsorption can occur. Depending upon the size of these intracrystal voids, molecules may be readily adsorbed, slowly adsorbed, or completely excluded.

The zeolite crystal structure consists of a three-dimensional framework of $SiO_4$ $AlO_4$ tetrahedra. The aluminum tetrahedron is slightly larger than the silicon tetrahedron. The alumina tetrahedra carry a negative charge, and therefore, a positive charge supplied by a metal cation must be associated with each alumina tetrahedron in the crystal. These metal cations in the zeolite structure are responsible for some of the pore size variations possible in these materials. They are also probably responsible for the very strong and selective adsorptive forces which are unique with molecular sieve catalyst. Catalytic activity can be controlled and varied by the nature of the cations in the crystal.

Although similar in composition, these crystalline zeolites are completely different in structure from the gel type amorphous aluminosilicates, commonly referred to as zeolites. These amorphous zeolites have been available for many years as water softeners. In adsorption applications, they are very similar to some silica gels. They have the same broad spectrum of pore sizes as the silica gels [20–10,000 angstroms, typically] and, therefore, do not exhibit any molecular sieving activity.

Those molecular sieves found most suitable for use in the present invention are those having a pore size in the range of about 8 to 15 angstroms and are characterized by the following approximate chemical composition when in anhydrous sodium form.

Type X: $Na_2O.Al_2O_3$. 2.0–3.0 $SiO_2$
Type Y: $Na_2O.Al_2O_3$. 3.0–6.0 $SiO_2$ The designations Type X and Type Y are well-known and recognized in the art and will therefore be employed hereinafter to refer to the molecular sieves employed in the present invention.

Both the Type X and Type Y zeolites may be employed in the forms indicated by the above chemical formulae. For instance, sodium-containing Type X molecular sieves are commercially available which will readily withstand the temperature conditions of the process, which will pass hydrocarbons of up to 10 angstroms diameter and will readily adsorb aromatics.

However, it may be found advantageous to remove some of the sodium ions from the catalyst in a manner which is known in the art. See for instance Venuto, Hamilton, Landis and Wise, volume X, No. 4, pages B–71 through B–89 of "Preprints" Division of Petroleum Chemistry, American Chemical Society, September 1965 and Kirsch, Potts and Barmby, volume XIII, No. 1, pages 153–164, March 1968, op cit. Especially preferred are the Type Y zeolites in which a major portion of the naturally-occurring sodium ions are replaced with a rare earth metal such as lanthanum or rhenium and in which the weight ratio of silica to alumina is between about 1.5 to 1 and about 7 to 1. The preferred mole ratio of silica to aluminum in the zeolite is 4.8 to 5 to 1. Specific examples of methods of removing sodium ion by cation exchange and metal-loading procedures for molecular sieves are given in the following U.S. Patents: 3,013,982, 3,013,983, 3,013,985, 3,013,988, 3,013,990, 3,114,695 and 3,130,006. The molecular sieve material may be employed in tabular, extrudate, bead and powder form but tablets of a size in the range of about 1/16 to 1/4 inch and extrudate of a diameter of about 1/8 inch are preferred. The most preferred pore size is approximately 10 angstroms, and the feed is preferably passed over the molecular sieve at a weight hourly space velocity in the range of about 0.5 to about 5.0, and most preferably at a weight hourly space velocity of about 0.8 to about 3.0.

The process may be conducted with no material other than the reactant hydrocarbon and the molecular sieve present in the reaction zone, while obtaining better yields than the 13½% maximum mentioned above for the thermal process. However, we have found that cleaner or lighter colored liquid product can be obtained when a gas is present in the reaction zone.

The gases which are useful are the carbon oxide gases, such as CO, $CO_2$ and mixtures thereof; any inert gas; and mixtures of the carbon oxide gases and inert gases. By "inert" is meant any gas other than the carbon oxide gases, reactive or non-reactive, which does not seriously impair the reaction, including especially unreactive inert gases such as nitrogen.

The preferred gases to be used in our process are carbon dioxide and mixtures of carbon dioxide and carbon monoxide.

It has been found that the highest yields of polyphenyls when using added gas are obtained with mixtures of carbon-oxide gases in which $CO_2$ predominates, and especially with $CO_2$ alone. When high percent yield is desired, carbon oxide gases containing at least about 75 mole percent carbon dioxide are preferably employed, since when the CO is present in substantial quantities such as above about mole 25%, it has a somewhat deleterious effect on the percent yield of polyphenyls. When the carbon oxide gases are employed, a small amount of water, ca, 1.5 wt. percent on feed, is formed as a by product.

It has been further found, however, that through the use of mixtures of carbon-oxide gases containing varying molar ratios of CO and $CO_2$, we can control the relative proportions of biphenyl and materials greater than biphenyl produced. When the CO content is increased, the ratio of biphenyl to materials greater than biphenyl produced is increased, and therefore, when high ratios of biphenyl to materials greater than biphenyl are desired, increasing amounts of CO in the gas mixture and especially CO alone are preferably used.

It is of course understood, that the exact ratio in which the CO and $CO_2$ are present in a carbon-oxide mixture will depend upon the combination of percent yield and ratio of biphenyl to materials boiling above biphenyl which one desires to obtain.

When a gas is employed in the process, it is preferably passed through the reaction mass at the rate of about 0.25 to about 5 moles per mole of aromatic compound, and more preferably at a rate of about 1 to 3 moles per mole of aromatic compound. When using a carbon-oxide gas, to be effective it should be present in the reaction zone in an amount of at least about 10 parts per million parts by volume of total gas charged (excluding the aromatic compound). Amounts up to $10^6$ parts per million may be employed.

Pressures of from about atmospheric pressure to about 1000 p.s.i.g. may be employed, but about 100 to about 500 p.s.i.g. is preferred. The most preferred pressures range from about 300 p.s.i.g. to about 500 p.s.i.g.

To obtain acceptable yields, the reaction is carried out using temperatures in the range of from about 1125° to about 1375° F., and preferably in the range of from about 1150° to 1350° F., and preferably 1200° to 1350° F. when preparing biphenyl from benzene. The reaction time of the reactant aromatic hydrocarbon and other gases, if any, to traverse the void volume of the catalyst bed is generally from about 5 to about 50 seconds.

The confined zone in which the process is conducted may be constructed of any desired material such as stainless steel, but there is a suggestion in the art that the presence of a copper compound in the confined zone or on its walls will inhibit tar and carbon formation. The confined zone may be part of a fixed or moving bed contactor, many types of which are familiar to those skilled in the hydrocarbon processing art.

The liquid products may be collected and separated by any conventional technique, such as by distillation.

Our invention will be more clearly understood from the following description read in conjunction with the accompanying drawings which schematically illustrate flow diagrams for the production of the polyphenyls from benzene. However, it will be understood that other aromatic compounds may be used in addition to or replacement of the benzene to produce products other than biphenyl, e.g. para phenyl phenol, di tolyl and the like.

In FIG. 1, the storage tank 1 contains an outlet line 2 which includes a pump 3. Line 2 connects into a heat exchanger 4 which outlets through line 5. Line 5 connects to a vaporizer 6 which connects through an outlet line 7 to a reactor 8. Reactor 8 through line 9 leads to a heat exchanger 10 which is provided with inlet and outlet lines 11 and 12, respectively, and which in turn connects to heat exchanger 4 through line 13. Line 14 connects heat exchanger 4 to a high pressure distillation unit 15 which contains outlet lines 16 and 23. Outlet line 16 connects to a heat exchanger 17 which in turn leads to a gas-liquid separator 19 through line 18. The separator 19 has an overhead outlet line 20 and has an outlet line 21 at the bottom which contains a valve 22 and which feeds into line 29 downstream from valve 22. The outlet line 23 of the distillation unit 15 connects to a heat exchanger 24. The heat exchanger 24 has an outlet line 29 which contains a valve 26 and which connects downstream of valve 26 to a low pressure flash distillation unit 34 having outlet lines 28 and 29. Outlet line 29 includes a pump 30 and a valve 31. Line 29 feeds into a benzene distillation column 32 downstream from valve 31.

The distillation column 32 has an overhead outlet line 33 which contains a pump 34 and which in turn feeds into line 2 prior to the entrance of line 2 into heat exchanger 4. The column 32 also has a bottom outlet line 30 which connects to a biphenyl vacuum distillation column 36 which has an overhead outlet line 37 and bottom outlet line 38.

The benzene or other aromatic reactive hydrocarbon is pumped from the storage tank 1 through line 2 by pump 3 into the heat exchanger 4 where it is heated. The preheated benzene is withdrawn from the exchanger 4 through line 5 and is fed into the vaporizer 6. The gaseous benzene is withdrawn from the vaporizer 6 through 7 and is fed into the reactor 8 which is provided with a bed of the molecular sieve catalyst. The reaction products are then withdrawn from the reactor through line 9 and passed through a steam generator heat exchanger 1 where the products are cooled, and where water is fed through line 11 and is withdrawn as steam through line 12. The cooled products are removed from the heat exchanger through line 13 and are passed through heat exchanger 4 where they are further cooled. The heat liberated in this exchanger is used to preheat fresh benzene which is fed to the exchanger 4 through line 2 and withdrawn through 5. The cooled reactive products are passed from the heat exchanger 5 through line 4 and are fed to a high pressure flash distillation unit 15. The lower boiling fractions of the product are withdrawn from the flash distillation unit 15 through line 16 and are passed through a heat exchanger 17 provided with cold water. The cooled material then is fed into a gas-liquid separator 19 through line 18 where the gases are taken off at the top through line 20. The liquid products are removed from the separator 19 at the bottom through line 21 and are fed into line 29 before entry into the benzene distillation column 32. The line 21 is provided with a valve 22 to control the amount of liquids from the separator to be subsequently fed into the benzene distillation column 32. The high boiling fractions of the reaction products are removed from the flash distillation unit 15 through line 23 and are passed through a heat exchanger 24, which is provided with cold water, to be cooled. The cooled material is fed into a low pressure flash distillation unit 27 through line 25 which is provided with a valve 26 in order to control the quantity of material to be sent into the distillation unit 27. The gases are taken off the flash distillation unit 27 through line 28 and can subsequently be used in fuels. The liquid hydrocarbons are pumped from the distillation unit 27 through line 29 by pump 30 and are fed to the benzene distillation column 32 through line 29 downstream from where the liquid products from the separator 21 are fed into line 29. Line 29 is provided with a valve 31 which controls the amount of material to be subsequently fed to the benzene distillation column 32. Benzene is removed from the colume 32 through line 33, and is pumped by pump 34 into line 2 where it is recycled back into the reactor. The higher boiling products are removed through line 35 at the bottom, frm where they are fed to a biphenyl vacuum distillation column 36 where biphenyl is separated at the top through line 37 and recovered. The higher boiling products are removed from the column 36 through line 38 at the bottom and are recovered.

Figure 2:
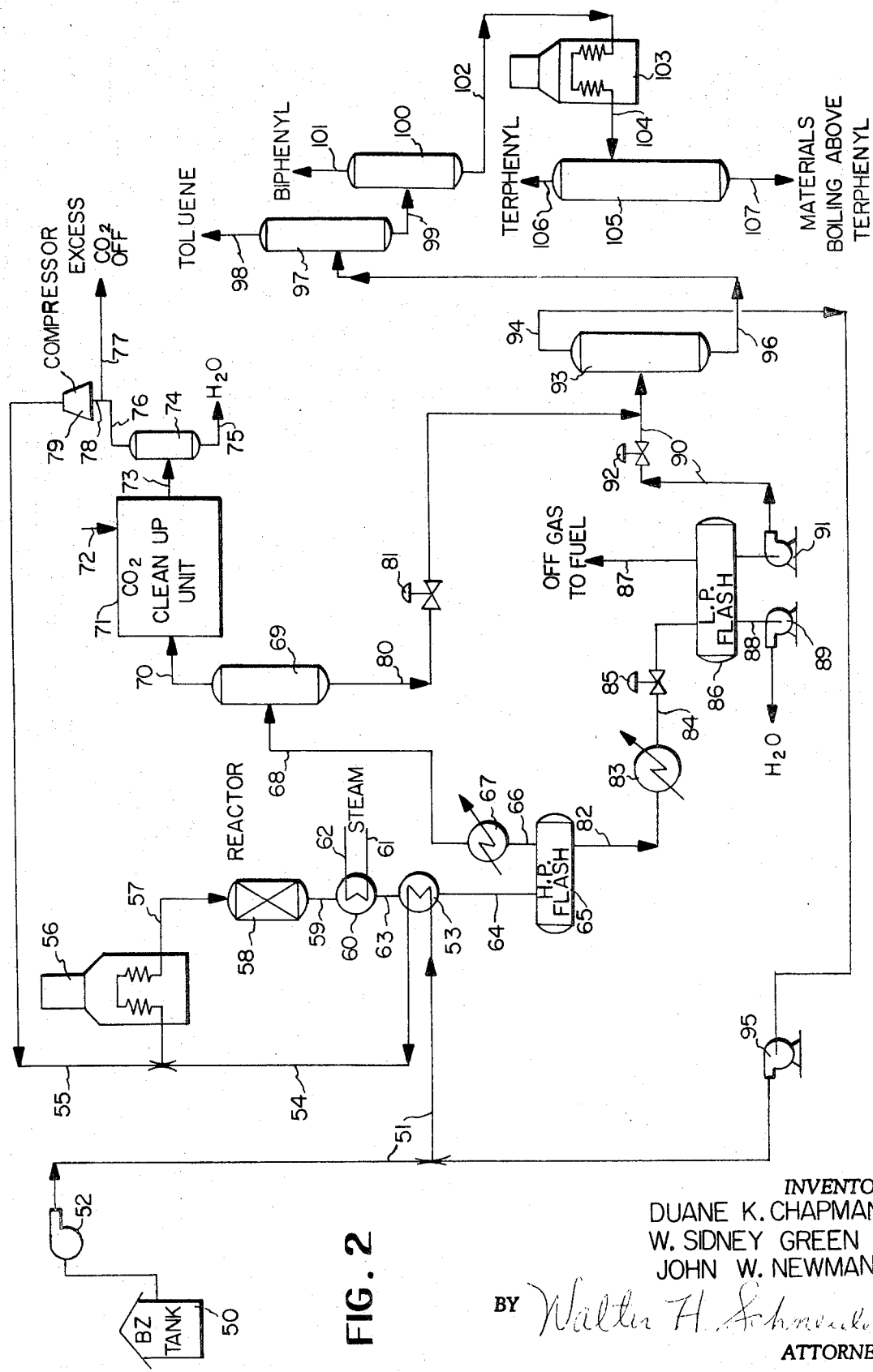
FIG. 2 illustrates the production of biphenyl and terphenyl using a molecular sieve catalyst in the presence of a gas such as $CO_2$.

In FIG. 2, the storage tank 50 contains an outlet line 51 which is provided with a pump 52. Line 51 connects into a heat exchanger 53 which outlets through line 54. Line 54 inlets into vaporizer 56. Line 55 feeds into line 54 prior to the entrance of line 54 into the vaporizer 56. The vaporizer contains an outlet line 57 which connects to reactor 58. The reactor has an outlet line 59 which connects to a heat exchanger 60 which contains inlet and outlet lines 61 and 62 respectively, and which connects through line 63 to heat exchanger 53. The heat exchanger 53 feeds through line 64 to a high pressure flash distillation unit 65 which contains outlet lines 66 and 82. The line 66 connects to a heat exchanger 67 which in turn leads to a gas-liquid separator 69 through line 68. The separator 69 has an overhead outlet line 70 which leads into a $CO_2$ clean-up unit 71 which also has an inlet line 72 and an outlet line 73. The line 73 feeds into a vapor-liquid separator 74 which contains an outlet line 75 at the bottom and an outlet line 76 at the top. The line 76 divides into lines 77 and 78, with line 78 connecting to a compressor 79 which in turn outlets into line 55. The separator 69 also has an outlet line 80 at the bottom which includes a valve 81 and which feeds into line 90 downstream from valve 81. The outlet line 82 of the distillation unit 65 connects to a heat exchanger 83. The heat exchanger 83 has an outlet line 84 which includes a valve 85 and which connects downstream of valve 85 to a low pressure flash distillation unit 86 having outlet lines 87, 88 and 90. Outlet lines 88 and 90 contain pumps 89 and 91, respectively. Line 90 feeds into a benzene distillation column 93 and has a valve 92 upstream from where line 80 feds into it. The distillation column 93 has an overhead outlet line 94 which includes a pump 95 and which in turn feeds into line 51 prior to the entrance of line 51 into heat exchanger 53. The column 93 also has a bottom outlet line 96 which connects to a toluene distillation column 97 which has an overhead outlet line 98 and a bottom outlet line 99. The bottom outlet line 99 connects to a biphenyl distillation column 100 which has an overhead outlet line 101 and a bottom outlet line 102 which in turn connects to a heat exchanger 103. The furnace 103 has an outlet line 104 which connects to a terphenyl distillation column 105 having an overhead outlet line 106 and a bottom outlet line 107.

The benzene or other aromatic reactive hydrocarbon is pumped from the storage tank 50 through line 51 by pump 52 into the heat exchanger 53, where it is heated. The preheated benzene is withdrawn through line 54 where $CO_2$ or other gas, which has been compressed in compressor 79 is introduced into it through line 55. Then the mixture of benzene and $CO_2$ is fed into the vaporizer 56 through 57 and is fed into the reactor 58 which is provided with a bed of the molecular sieve catalyst. The reaction products are then withdrawn from the reactor through line 59 and are passed through steam generator heat exchanger 60 where the products are cooled, and where water is fed through line 61 and is withdrawn as steam through line 62. The cooled products are removed from the heat exchanger through line 63 and are passed through heat exchanger 53 where they are further cooled. The heat liberated in this exchanger is used to preheat fresh benzene which is fed to the exchanger 53 through line 51 and withdrawn through 54. The cooled reactive products are passed from the heat exchanger 53 through line 64 and are fed to a high pressure flash distillation unit 65. The lower boiling fractions of the product are withdrawn from the flash distillation unit 65 through line 66 and are passed through a heat exchanger 67 provided with cold water. The cooled material then is fed into a gas-liquid separator 69 through line 68 where the gases are taken off at the top through 70 and are fed into a $CO_2$ clean-up unit 71. Oxygen is fed into the $CO_2$ clean-up unit through line 72. The oxygen reacts with the hydrogen and any hydrocarbon gases formed during the reaction to produce a mixture $CO_2$ and $H_2O$. The mixture of $CO_2$ and $H_2O$ is removed from the unit 72 through line 73 and is fed into a vapor-liquid separator 74 where $H_2O$ is taken off at the bottom through line 75 and $CO_2$ is taken off at the top through line 76. Any excess $CO_2$ is then removed through line 77 and the remaining $CO_2$ is fed into compressor 79 through line 78 from where it is fed into line 55 and recycled back into the reaction stream.

The liquid products are removed from the separator 69 at the bottom through line 80 and are fed into line 90 before being led to the benzene distillation column 93. The line 80 is provided with a valve 81 to control the amount of liquids from the separator to be subsequently fed into the benzene distillation column 93. The higher boiling fractions of the reaction products are removed from the flash distillation unit 65 through line 82 and are passed through a heat exchanger 83, which is provided with cold water, to be cooled. The cooled material is fed into a low pressure flash distillation unit 86 through line 84 which is provided with a valve 85 in order to control the quantity of material which is allowed to flow into the distillation unit 86. The gases are taken off the flash distillation unit 86 through line 87 and can subsequently be used in fuels. Water is pumped from the distillation unit 86 through 88 by pump 89 and the liquid hydrocarbons are pumped from the distillation unit 86 through line 90 by pump 91 and are fed to the benzene distillation column 93 through line 90 downstream from where the liquid products from the separator 69 are fed into line 90. Line 90 is provided with a valve 92 which controls the amount of material to be subsequently fed into the benzene distillation column 93. Benzene is removed from the column 93 through 94, and is pumped by pump 95 into line 51 where it is recycled back into the reactor. The higher boiling products are removed from column 93 through line 96 at the bottom, from which they are fed to a toluene distillation column 97. The toluene and other compounds boiling between benzene and biphenyl are removed from the column 97 through line 98 at the top and are recovered, and the higher boiling products are removed at the bottom through line 99. The bottoms products are then fed to a biphenyl vacuum distillation column 100 where biphenyl is separated at the top through line 101 and is recovered. The higher boiling products are removed from the column through line 102 at the bottom and are fed to a furnace 103 to be heated. These heated products are then fed through line 104 to a terphenyl vacuum distillation column 105 where the terphenyl is separated at the top through line 105 and recovered. The polyphenyls higher than terphenyl are removed from the bottom of the column 105 through line 107 and are recovered.

In order that the invention may be better understood, the following non-limiting examples are given:

Example 1

In a fixed bed reactor containing ⅛" diameter tablets of a Type Y molecular sieve characterized by a pore size of approximately 10 angstroms, a void volume of about 28%, a $SiO_2$ to $Al_2O_3$ wt. ratio of about 4.9 to 1, in which the major portion of the naturally-occurring sodium ions have been replaced by ion exchange with rare earth metal, and which is partially decationized, available under the trade name Linde SK-500, benzene is caused to flow through the fixed bed of catalyst at an average bed temperature of 1284° F. under a pressure of 400 p.s.i.g. at a weight hourly space velocity of 0.92 and in the presence of carbon dioxide in a mole ratio of 0.85 to 1 per mole of benzene. The average feed rate of liquid benzene to the reactor is 57 cc./hr. The yield, total liquid products based on benzene feed, in liquid volume per cent, is 94.4. An analysis of the liquid product by gas chromatographic analysis discloses that it contains 66.0% benzene, a trace of toluene, 24.7% of biphenyl, and 9.3% of materials boiling in the range above biphenyl. The chromatograms are very "clean" with little or no compounds present between the ones reported in the analysis. No noticeable amount of carbon is formed.

Example 2

Example 1 is repeated at an average bed temperature of 1283° F., a pressure of 400 p.s.i.g., a WHSV of 0.93, at an average feed rate of 56 cc./hr., with no additional gas being added, and a hydrocarbon liquid volume per cent yield of 98.6 is obtained. A gas chromatographic analysis of the liquid product disclosed the presence of 67.4% benzene, 20.9% biphenyl, and 11.7% of materials boiling above biphenyl.

Example 3

Example 1 is repeated with Linde SK-300 catalyst at an average bed temperature of 1283° F., a pressure of 400 p.s.i.g., a WHSV of 1.1, a carbon dioxide to benzene mol ratio of 1.6, an average feed rate of 60 cc./hr., and a hydrocarbon liquid volume percent yield of 93.6 is obtained. A gas chromatographic analysis of the liquid product disclosed the presence of 66.6% benzene, 22.1% biphenyl, and 11.3% of materials boiling above biphenyl. SK-300 catalyst is a molecular sieve type Y containing palladium and having an $SiO_2$ to $Al_2O_3$ weight ratio of about 3.0 to 1.

Example 4

Example 1 is repeated with a Linde type 13X catalyst, an alkali metal aluminosilicate having the X crystal structure that will admit molecules with critical dimensions up to 13 angstroms, at an average bed temperature of 1286° F., a pressure of 400 p.s.i.g., a WHSV of 1.09, a carbon dioxide to benzene mole ratio of 1.4, at an average feed rate of 63 cc./hr., and a hydrocarbon liquid volume percent yield of 95.6 is obtained. A gas chromatographic analysis of the liquid product disclosed the presence of 66.6% benzene, 22.1% biphenyl, and 11.3% of materials boiling above biphenyl.

Example 5

Example 1 repeated with Linde SK-400 catalyst, a type Y molecular sieve containing nickel, at an average bed temperature of 1282° F., a pressure of 400 p.s.i.g., a WHSV of 1.07, a carbon dioxide to benzene mol ratio of 1.4 at average feed rate of 63 cc./hr., and a hydrocarbon liquid volume percent yield of 96.0% is obtained. A gas chromatographic analysis of the liquid product disclosed the presence of 69.4% benzene, 21.6% biphenyl, and 9.0% of materials boiling above biphenyl.

Example 6

Example 1 is repeated with Linde SK-310 catalyst, a calcium exchanged type Y molecular sieve containing palladium, at an average bed temperature of 1283° F., a pressure of 400 p.s.i.g., a WHSV of 0.98, at an average feed rate of 57 cc./hr., and a hydrocarbon liquid volume percent yield of 97.5 is obtained. A gas chromatographic analysis of the liquid product disclosed the presence of 68.8% benzene, 21.0% biphenyl, and 10.2% material boiling above biphenyl.

Example 7

Example 1 is repeated with Linde SK-100 catalyst, a decationized molecular sieve, type Y, containing palladium, at an average bed temperature of 1283° F., a pressure of 400 p.s.i.g., a WHSV of 1.18, a carbon dioxide to benzene mol ratio of 1.5 at an average feed rate of 61 cc./hr., and a hydrocarbon liquid volume percent yield of 95 is obtained. A gas chromatographic analysis of the liquid product disclosed the presence of 73.3% benzene, 19.7% biphenyl, and 7.0% of materials boiling above biphenyl.

Example 8

Example 1 is repeated with Linde SK-110 catalyst, a partially decationized, partially manganese exchanged type Y molecular sieve containing palladium, at an average bed temperature of 1283° F., a pressure of 400 p.s.i.g., a WHSV of 1.12, a carbon dioxide to benzene mol ratio of 1.4, at an average feed rate of 63 cc./hr., and a hydrocarbon liquid volume percent yield of 94.2 is obtained. A gas chromatographic analysis of the liquid product disclosed the presence of 69.4% benzene, 21.3% biphenyl, and 9.3% of materials boiling above biphenyl.

Example 9

Example 1 is repeated with Linde SK-500 catalyst at an average bed temperature of 1284° F., at a pressure of 400 p.s.i.g., a WHSV of 1.08, a 90/10 $CO_2$/CO mixture in a molar ratio to benzene of 1.4, at an average feed rate of 64 cc./hr., and a hydrocarbon liquid volume percent yield of 97.6 is obtained. A gas chromatographic analysis of the liquid product disclosed the presence of 75% benzene, 18.2% biphenyl, and 6.8% of material boiling above biphenyl.

Example 10

Example 1 is repeated at an average bed temperature of 1284° F., a pressure of 400 p.s.ig., a WHSV of 1.06, a 75 to 25 $CO_2$ to CO mixture in a mole ratio to benzene of 1.4, at an average feed rate of 63 cc./hr., and a hydrocarbon liquid volume percent yield of 97.3 is obtained. A gas chromatographic analysis of the product disclosed the presence of 76.5% benzene, 18.4% biphenyl, and 5.1% of materials boiling above biphenyl.

Example 11

Example 1 is repeated at an average bed temperature of 1284° F., a presure of 400 p.s.i.g., a WHSV of 1.08, a 40 to 60 $CO_2$ to CO mixture in a mol ratio to benzene of 1.4, at an average feed rate of 64 cc./hr., and a hydrocarbon liquid volume percent yield of 96.7 is obtained. A gas chromatographic analysis of the liquid produce disclosed the presence of 79.4% benzene, 16.5% biphenyl, and 4.1% of materials boiling above biphenyl.

Example 12

Example 1 is repeated at an average bed temperature of 1282° F., a pressure of 400 p.s.i.g., a WHSV of 1.03, a 10 to 90 $CO_2$ to CO mixture in a mole ratio to benzene of 1.5, at an average feed rate of 64 cc./hr., and a hydrocarbon liquid volume percent yield of 93.4 is obtained. A gas chromatographic analysis of the product disclosed the presence of 83.6% benzene, 14.3% biphenyl, and 2.1% of materials boiling above biphenyl.

Example 13

Example 1 is repeated at an average bed temperature of 1284° F., a pressure of 400 p.s.i.g., WHSV of .98, a nitrogen to benzene mole ratio of 1.4, at an average feed rate of 58 cc./hr., and a hydrocarbon liquid volume percent yield of 98.8 is obtained. A gas chromatographic analysis of the liquid product disclosed the presence of 77.2% benzene, 17.6% biphenyl, and 5.2% of materials boiling above biphenyl.

Example 14

Example 1 is repeated at an average bed temperature of 1284° F., a pressure of 400 p.s.i.g., a WHSV of 1.00, a gas mixture of 1000 p.p.m. $CO_2$ in $N_2$ in a mole ratio to benzene of 1.4, at an average feed rate of 62 cc./hr., and a hydrocarbon liquid volume percent yield of 96.0 is obtained. A gas chromatographic analysis of the liquid product disclosed the presence of 76.1% benzene, 18.1% biphenyl, and 5.8% of materials boiling above biphenyl.

Example 15

Example 1 is repeated at an average bed temperature of 1283° F., a pressure of 400 p.s.i.g., a WHSV of 0.98, a gas mixture of 10% $CO_2$ and 90% $N_2$ in a mole ratio to benzene of 1.4, at an average feed rate of 61 cc./hr., and a hydrocarbon liquid volume percent yield of 96.9 is obtained. A gas chromatographic analysis of the liquid product disclosed the presence of 75.9% benzene, 18.6% biphenyl, and 5.5% of materials boiling above biphenyl.

Example 16

Example 1 is repeated at an average bed temperature of 1284° F., a pressure of 400 p.s.i.g., a WHSV of 1.00, a gas mixture of 50% $CO_2$ and 50% $N_2$ in a mole ratio to benzene of 1.4, at an average feed rate of 62 cc./hr., and a hydrocarbon liqiud volume percent yield of 97.3 is obtained. A gas chromatographic analysis of the liquid product disclosed the presence of 79.2% benzene, 16.6% biphenyl, and 4.2% of materials boiling above biphenyl.

Example 17

Example 1 is repeated at an average bed temperature of 1284° F., a pressure of 200 p.s.i.g., a WHSV of 0.60, a $CO_2$ to benzene mole ratio of 1.4, at an average feed rate of 35.7 cc./hr., and a hydrocarbon liquid volume percent yield of 96.5 is obtained. A gas chromatographic analysis of the liquid product disclosed the presence of 78.8% benzene, 16.8% biphenyl, and 4.4% of materials boiling above biphenyl.

Example 18

Example 1 is repeated at an average bed temperature of 1283° F., at a pressure of 800 p.s.i.g., a WHSV of 0.84, a $CO_2$ to benzene mole ratio of 1.7, at an average feed rate of 52 cc./hr., and a hydrocarbon liquid volume percent yield of 91.5% is obtained. A gas chromatographic analysis of the liquid product discloses presence of 71.7% benzene, 20.6% biphenyl, 7.6% of material boiling above biphenyl, and 0.1% toluene.

Example 19

Example 1 is repeated at an average bed temperature of 1283° F., at a pressure of 600 p.s.i.g., at a WHSV of 1.03, a $CO_2$ to benzene mole ratio of 1.38, at an average feed rate ot 64 cc./hr., and a hydrocarbon liquid volume percent yield of 94.8 is obtained. A gas chromatographic analysis of the liquid product disclosed the presence of 74.4% benzene, 20% biphenyl, 5% of materials boiling above biphenyl, and 0.6% toluene.

Example 20

Example 1 is repeated at an average bed temperature of 1283 F., a ta pressure of 400 p.s.i.g., a WHSV of 1.1 with no additional gas being added, at an average feed rate of 68 cc./hr., and a hydrocarbon liquid volume percent yield of 96.2 is obtained. A gas chromatographic analysis of the liquid product disclosed the presence of 71.7% benzene, 21.7% biphenyl, 6.4% of materials boiling above biphenyl, and 0.2% toluene.

Example 21

Example 1 is repeated at an average bed temperature of 1282° F., a pressure of 400 p.s.i.g., a WHSV of .82, and with no additional gas being added, at an average rate of 51 cc./hr., and a hydrocarbon liquid volume percent yield of 96.4 is obtained. A gas chromatographic analysis of the liquid product disclosed the presence of 74.3% benzene, 20.4% biphenyl, and 5.2% of materials boiling above biphenyl, and 0.1 toluene.

Example 22

Example 1 is repeated at an average bed temperature of 1283° F., a pressure of 400 p.s.i.g., a WHSV of 1.03, with no additional gas being added, at an average feed rate of 62 cc./hr., and a hydrocarbon liquid volume percent yield of 96.8 is obtained. A gas chromatographic analysis of the liquid product disclosed the presence of 70.1% benzene, 20.4% biphenyl, and 9.5% of materials boiling above biphenyl.

Example 23

Example 1 is repeated at an average bed temperature of 1282° F., a pressure of 400 p.s.i.g., a WHSV of 1.67 with no additional gas being added, at an average feed rate of 100 cc./hr., and a hydrocarbon liquid volume percent yield of 99.5 is obtained. A gas chromatographic analysis of the liquid product disclosed the presence of 76.3% benzene, 18.0% biphenyl, and 5.7% of materials boiling above biphenyl.

Example 24

Example 1 is repeated at an average bed temperature of 1281° F., a pressure of 400 p.s.i.g., a WHSV of 2.62, with no additional gas being added, at an average feed rate of 157 cc./hr., and a hydrocarbon liquid volume percent yield of 97.3 is obtained. A gas chromatographic analysis of the liquid product disclosed the presence of 77.3% benzene, 17.3% biphenyl, and 5.4% of materials boiling above biphenyl.

Example 25

Example 1 is repeated at an average bed temperature of 1282° F., a pressure of 400 p.s.i.g., a WHSV of 2.58, with no additional gas being added, at an average feed rate of 155 cc./hr., and a hydrocarbon liquid volume percent yield of 99.6 is obtained. A gas chromatographic analysis of the liquid product disclosed the presence of 77.4% benzene, 17.0% biphenyl, and 5.7% materials boiling above biphenyl.

Example 26

Example 1 is repeated at an average bed temperature of 1283° F., a pressure of 400 p.s.i.g., a WHSV of 1.00, with no additional gas being added, at an average feed rate of 60 cc./hr., and a hydrocarbon liquid volume percent yield of 97.5 is obtained. A gas chromatographic analysis of the liquid product disclosed the presence of 68.1% benzene, 21.5% biphenyl, and 10.4% of materials boiling above biphenyl.

Example 27

Example 1 is repeated at an average bed temperature of 1283° F., a pressure of 200 p.s.i.g., a WHSV of 0.98, with no additional gas being added, at an average feed rate of 59 cc./hr., and a hydrocarbon liquid volume percent yield of 93.7 is obtained. A gas chromatographic analysis of the liquid product disclosed the presence of 73.3% benzene, 19.6% biphenyl, and 7.1% of materials boiling above biphenyl.

Example 28

Example 1 is repeated at an average bed temperature of 1283° F., a pressure of 600 p.s.i.g., a WHSV of 1.03, with no additional gas being added, at an average feed rate of 62 cc./hr., and a hydrocarbon liquid volume percent yield of 98.0 is obtained. A gas chromatographic analysis of the liquid product disclosed the presence of 70.3% benzene, 22.7% biphenyl, and 7.1% of materials boiling above biphenyl.

Example 29

Example 1 is repeated at an average bed temperature of 1283° F., a pressure of 800 p.s.i.g., a WHSV of 1.02, with no additional gas being added, at an average feed rate of 61 cc./hr., and a hydrocarbon liquid volume percent yield of 97.3 is obtained. A gas chromatographic analysis of the liquid product disclosed the presence of 66.2% benzene, 25.8% biphenyl, and 8.0% of materials boiling above biphenyl.

Example 30

Example 1 is repeated at an average bed temperature of 1283° F., a pressure of 1000 p.s.i.g., a WHSV of 1.00, with no additional gas being added, at an average feed rate to 60 cc./hr., and a hydrocarbon liquid volume percent yield of 98.5 is obtained. A gas chromatographic analysis of the liquid product disclosed the presence of 67.3% benzene, 24.7% biphenyl, and 8.0% of materials boiling above biphenyl.

Example 31

Example 1 is repeated at an average bed temperature of 1283° F., a pressure of 400 p.s.i.g., a WHSV of 0.58, a $CO_2$ to benzene mole ratio of 1.35, at an average feed rate of 36 cc./hr., and a hydrocarbon liquid volume percent yield of 92.5 is obtained. A gas chromatographic analysis of the product disclosed the presence of 6.95% benzene, 22.2% biphenyl, 8.3% materials boiling above biphenyl, and trace amounts of toluene.

Example 32

Example 1 is repeated at an average bed temperature of 1308° F., a pressure of 400 p.s.i.g., a WHSV of 1.02, a $CO_2$ to benzene mole ratio of 1.4, at an average feed rate of 63 cc./hr., and a hydrocarbon liquid volume percent yield of 98.0 is obtained. A gas chromatographic analysis of the liquid product disclosed the presence of 70.8% benzene, 22.2% biphenyl, 6% of material boiling above biphenyl, and 0.1% toluene.

Example 33

Example 1 is repeated at an average bed temperature of 1334° F., a pressure of 400 p.s.i.g., a WHSV of 1.00, a $CO_2$ to benzene mole ratio of 1.4, at an average feed rate of 62 cc./hr., and a hydrocarbon liquid volume percent yield of 90.6 is obtained. A gas chromatographic analysis of the liquid product disclosed the presence of 71.1% benzene, 20.3% of biphenyl, 0.1% toluene, and 8.5% of material boiling above biphenyl.

Example 34

Example 1 is repeated at an average bed temperature of 1276° F., a pressure of 400 p.s.i.g., a WHSV of 1.06, a $CO_2$ to benzene mole ratio of 1.4, at an average feed rate of 66 cc./hr., and a hydrocarbon liquid volume percent yield of 96.6 is obtained. A gas chromatographic analysis of the liquid product disclosed the presence of 69.0% benzene, 22.1% biphenyl, and 8.9% of materials boiling above biphenyl.

Example 35

Example 1 is repeated with toluene as feed at an average bed temperature of 1283° F., a pressure of 800 p.s.i.g., a WHSV of 1.10, at an average feed rate of 66 cc. per hour, a $CO_2$ to toluene mole ratio of 1.48, and a hydrocarbon liquid volume percent yield of 93.3 is obtained. A gas chromatographic analysis of the liquid product discloses the presence of 7.1% benzene, 83.49%, toluene, 1.1% of material boiling between toluene and biphenyl, 0.2% biphenyl and 8.2% methylated biphenyl.

Example 36

Example 1 is repeated with a feed consisting of a mixture of phenol and benzene in a mole ratio of 1 to 1 at an average bed temperature of 1183° F., a pressure of 800 p.s.i.g., a WHSV of 1.0, at an average feed rate of 60 cc. per hour, a $CO_2$ to feed mole ratio of 1.36, and a hydrocarbon liquid volume percent yield of 97.1 is obtained. A gas chromatographic analysis of the liquid product discloses the presence of 44.2% benzene, 41.2% phenol, 5.2% biphenyl, 2.8% of material boiling between biphenyl and paraphenyl phenol, 3.0% paraphenyl phenol, and 3.6% of material boiling above paraphenyl phenol.

Example 37

Example 1 is repeated with naphthalene as feed, at an average bed temperature of 1328° F., a pressure of 800 p.s.i.g., WHSV of 1.1, at an average feed rate of 60 cc. per hour, a $CO_2$ to naphthalene mole ratio of 1.55, and a hydrocarbon liquid volume percent yield of 89 is obtained. A gas chromatographic analysis of the liquid product discloses the presence of 1.8% of material boiling less than naphthalene, 93.3% naphthalene, 0.1% of material boiling between naphthalene and biphenyl, 0.1% biphenyl and 4.7% dinaphthyls.

Example 38

Example 1 is repeated with a feed consisting of a mixture of benzene and naphthalene in a mole ratio of 1 to 1 at an average bed temperature of 1326° F., a pressure of 600 p.s.i.g., a WHSV of 1.02, at an average feed rate of 56 cc. per hour, a $CO_2$ to feed mole ratio of 1.43, and a hydrocarbon liquid volume percent yield of 91 is obtained. A gas chromatographic analysis of the liquid product discloses the presence of 28.8% benzene, 0.6% toluene, 0.2% of material boiling between toluene and naphthalene, 51.1% naphthalene, 0.3% of material boiling between naphthalene and biphenyl, 7.4% biphenyl, 7.8% phenyl naphthalene, 2.8% terphenyls, and 1.0% dinaphthyls.

In Examples 22–30, 35 and 36, the catalyst was in the form of 1/16" to 1/8" diameter extrudate instead of tablets.

What is claimed is:

1. In a process for introducing an aryl group into an aromatic compound boiling in the range of about 170° F. to about 1000° F. having at least one reactive nuclear carbon atom to produce an arylated aromatic, the improvement which comprises: feeding an aromatic feed containing at least one such aromatic compound into a confined zone; in said zone, contacting said feed with a molecular sieve characterized by a pore size in the range of about 8 to about 15 angstroms at a temperature of about 1125° F. to about 1375° F. at a weight hourly space velocity of about 0.5 to about 5.0 and a pressure of about 1 to 70 atmospheres; and recovering the resultant products from said confined zone.

2. Process in accordance with claim 1 wherein the aromatic feed is benzene, and the product is a polyphenyl.

3. A process in accordance with either of claims 1 or 2 which additionally comprises contacting said feed in said zone with a flow of gas in addition to said feed.

4. A process in accordance with claim 3 wherein the molar ratio of said flow of gas is in the range of about 0.25 to about 5 moles per mole of aromatic compound.

5. A process in accordance with claim 3 wherein said flow of gas contains at least about 10 parts per million by volume one carbon-oxide gas and the molar ratio of gas is in the range of about 0.25 to about 5 moles per mole of benzene.

6. A process in accordance with claim 3 wherein the carbon oxide gas is selected from the group consisting of carbon dioxide and mixtures of carbon dioxide and carbon monoxide containing at least about 75 mole percent carbon dioxide.

7. A process in accordance with claim 6 wherein said molecular sieve is a Type X zeolite.

8. Process in accordance with either of claims 1 or 2 wherein the temperature is 1250 to 1350° F., the pressure is 300 to 500 p.s.i.g., the weight hourly space velocity is ½ to 4 and the product includes biphenyl and terphenyl.

9. Process in accordance with either of claims 1 or 2 wherein said molecular sieve is a Type Y zeolite.

10. Process in accordance with either of claims 1 or 2 wherein said molecular sieve is a Type X zeolite.

References Cited

UNITED STATES PATENTS 3,274,277  9/1966  Bloch _____ 260—670

CURTIS R. DAVIS, Primary Examiner

U.S. Cl. X.R.

260—820